(12) United States Patent
Lim et al.

(10) Patent No.: US 11,984,609 B2
(45) Date of Patent: May 14, 2024

(54) BATTERY CELL AND BATTERY CELL MANUFACTURING APPARATUS

(71) Applicant: LG Energy Solution, Ltd., Seoul (KR)

(72) Inventors: Hun-Hee Lim, Daejeon (KR);
Sang-Hun Kim, Daejeon (KR);
Min-Hyeong Kang, Daejeon (KR);
Hyung-Kyun Yu, Daejeon (KR);
Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/917,424

(22) PCT Filed: Jan. 25, 2022

(86) PCT No.: PCT/KR2022/001335
§ 371 (c)(1),
(2) Date: Oct. 6, 2022

(87) PCT Pub. No.: WO2022/164182
PCT Pub. Date: Aug. 4, 2022

(65) Prior Publication Data
US 2023/0187748 A1    Jun. 15, 2023

(30) Foreign Application Priority Data

Jan. 28, 2021    (KR) .................... 10-2021-0012231

(51) Int. Cl.
*H01M 50/186*    (2021.01)
*H01M 50/184*    (2021.01)
(Continued)

(52) U.S. Cl.
CPC ....... *H01M 50/186* (2021.01); *H01M 50/184* (2021.01); *H01M 50/394* (2021.01); *H01M 50/538* (2021.01)

(58) Field of Classification Search
CPC ............. H01M 50/186; H01M 50/184; H01M 50/394; H01M 50/538; H01M 2200/20;
(Continued)

(56) References Cited

U.S. PATENT DOCUMENTS

2006/0238162 A1    10/2006    Cheon et al.
2014/0199581 A1    7/2014    Ryu et al.
(Continued)

FOREIGN PATENT DOCUMENTS

CN    107968167 A    4/2018
CN    111656570 A    9/2020
(Continued)

OTHER PUBLICATIONS

International Search Report for PCT/KR2022/001335 dated May 18, 2022. 3 pgs.
(Continued)

*Primary Examiner* — Helen Oi K Conley
(74) *Attorney, Agent, or Firm* — Lerner David LLP

(57) ABSTRACT

A battery cell includes a battery case having an accommodation portion in which an electrode assembly is mounted, and a sealing portion formed by sealing an outer periphery thereof; an electrode lead electrically connected to an electrode tab of the electrode assembly and protruding out of the battery case; and a lead film located at a portion corresponding to the sealing portion in one of an upper portion and a lower portion of the electrode lead. The lead film has a dented portion recessed in an inner direction of the battery case. The dented portion is opened toward outside of the battery case. The sealing portion located on a gas inlet portion of the dented portion has a recessed sealing portion recessed outward from an inner side of the battery case, and the recessed sealing portion does not overlap with a part of the gas inlet portion on a plane.

20 Claims, 10 Drawing Sheets

(51) Int. Cl.
*H01M 50/30* (2021.01)
*H01M 50/538* (2021.01)

(58) Field of Classification Search
CPC .. H01M 10/04; H01M 50/105; H01M 50/119; H01M 50/121; H01M 50/124; H01M 50/129; H01M 50/176; H01M 50/188; H01M 50/193; H01M 50/178; H01M 50/30; H01M 50/531; H01M 50/533; H01M 50/534; H01M 50/548; H01M 50/55; H01M 50/553; H01M 50/557; H01M 50/562; H01M 50/566; Y02E 60/10; Y02P 70/50
See application file for complete search history.

(56) References Cited

U.S. PATENT DOCUMENTS

| | | |
|---|---|---|
| 2016/0315301 A1 | 10/2016 | Kim et al. |
| 2018/0114955 A1 | 4/2018 | Robert et al. |
| 2018/0114964 A1 | 4/2018 | Kim et al. |
| 2020/0028128 A1 | 1/2020 | Hwang et al. |
| 2020/0321577 A1 | 10/2020 | Kim et al. |
| 2021/0074977 A1 | 3/2021 | Ko et al. |

FOREIGN PATENT DOCUMENTS

| | | |
|---|---|---|
| JP | S58-046824 A | 10/1983 |
| JP | S61063761 U | 4/1986 |
| JP | 2009-146812 A | 7/2009 |
| JP | 2012-089532 A | 5/2012 |
| JP | 2015-510240 A | 4/2015 |
| JP | 2018525804 A | 9/2018 |
| JP | 2020-509553 A | 3/2020 |
| KR | 100684724 B1 | 2/2007 |
| KR | 101011807 B1 | 2/2011 |
| KR | 20130014253 A | 2/2013 |
| KR | 20140087773 A | 7/2014 |
| KR | 20150062688 A | 6/2015 |
| KR | 20160126157 A | 11/2016 |
| KR | 20170027150 A | 3/2017 |
| KR | 20170096852 A | 8/2017 |
| KR | 20190022196 A | 3/2019 |
| KR | 20190123059 A | 10/2019 |

OTHER PUBLICATIONS

Search Report dated Sep. 18, 2023 from the Office Action for Chinese Application No. 202280003343.6 issued Sep. 21, 2023, pp. 1-2. [See p. 1, categorizing the cited references].

FIG. 4
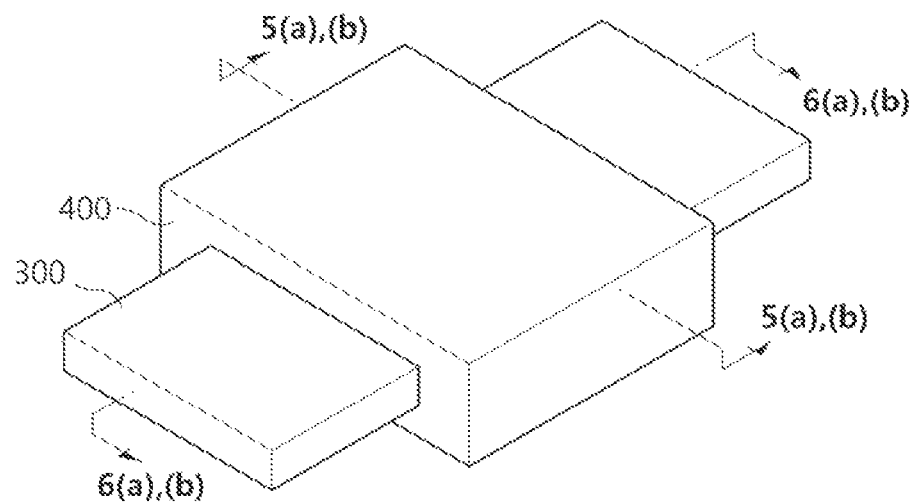
FIG. 5
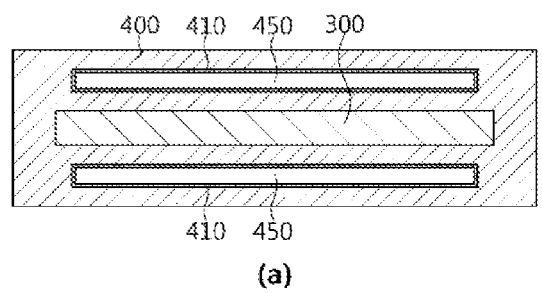
(a)
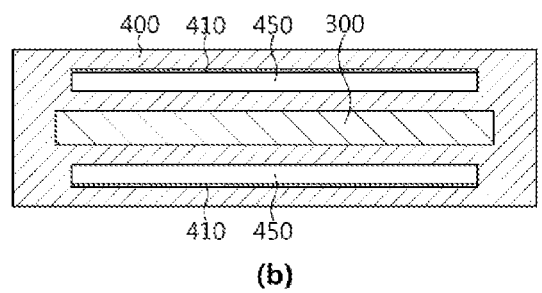
(b)

FIG. 6
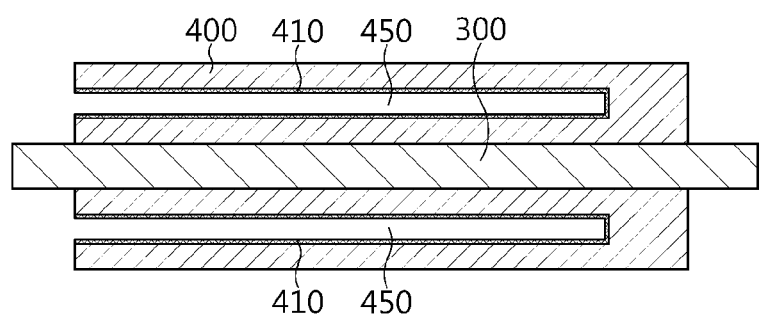
(a)
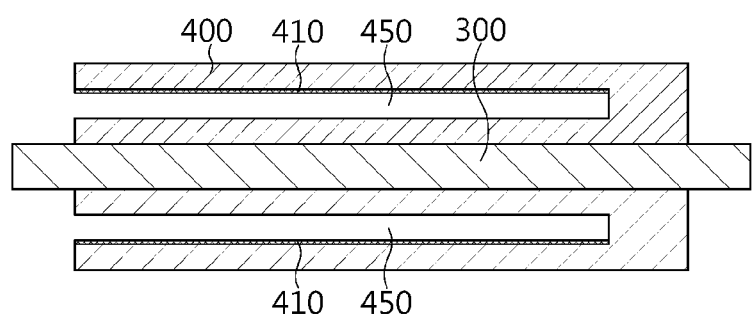
(b)

FIG. 7
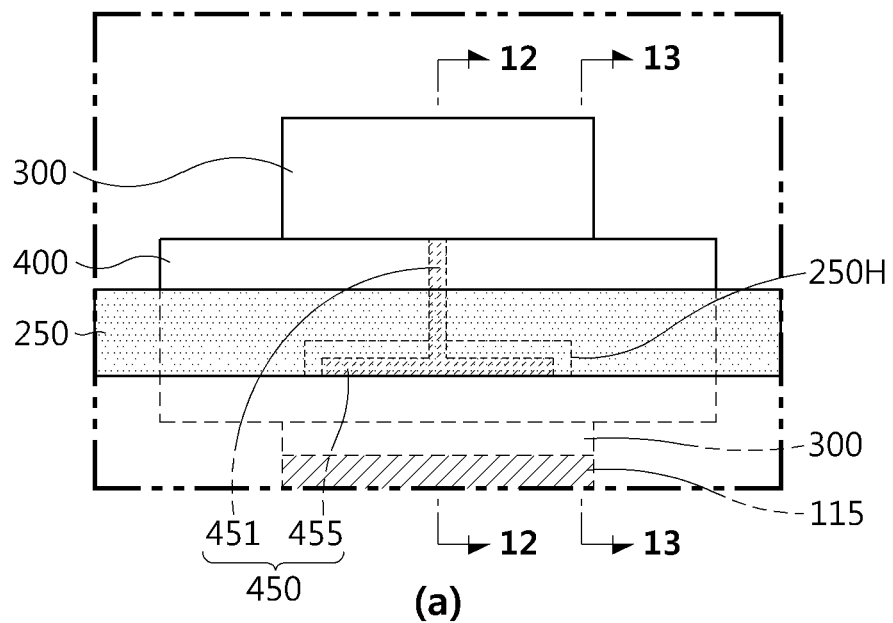
(a)
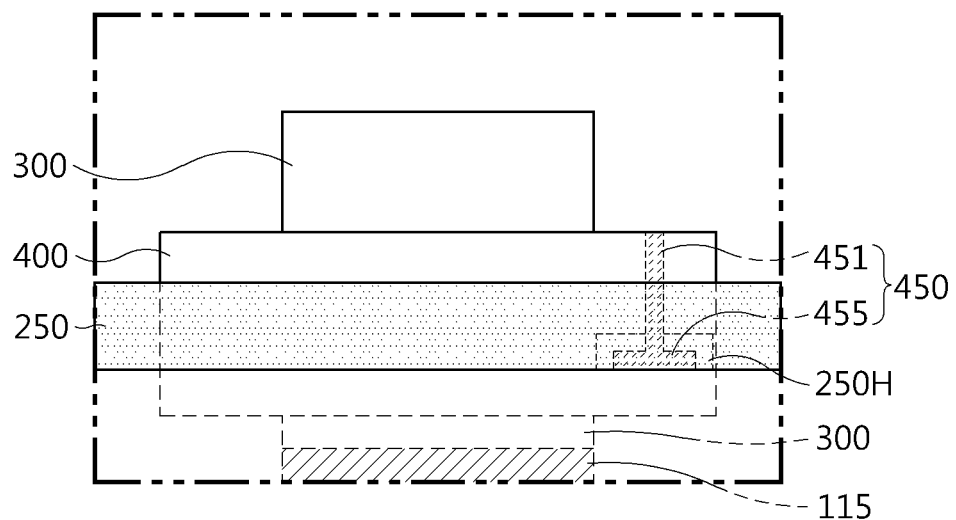
(b)

(a)        (b)

BATTERY CELL AND BATTERY CELL MANUFACTURING APPARATUS

CROSS-REFERENCE TO RELATED APPLICATIONS

The present application is a national phase entry under 35 U.S.C. § 371 of the International Application No. PCT/KR2022/001335, filed on Jan. 25, 2022, which claims the benefit of Korean Patent Application No. 10-2021-0012231 filed on Jan. 28, 2021, all of which are incorporated herein by reference in their entireties.

FIELD OF THE INVENTION

The present disclosure relates to a battery cell and a battery cell manufacturing apparatus, and more particularly, to a battery cell with improved external emission of gas generated inside the battery cell, and a battery cell manufacturing apparatus.

BACKGROUND OF THE INVENTION

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which a battery assembly is included in a cylindrical or prismatic metal can, and a pouch-type battery in which the battery assembly is included in a pouch-type case of an aluminum laminate sheet. Here, the battery assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type battery assembly is included in a pouch-type battery case made of an aluminum laminate sheet is being used more and more due to low manufacturing cost, small weight, and easy modification.

FIG. 1 is a top view showing a conventional battery cell. FIG. 2 is a cross-sectional view, taken along the axis 2-2 of FIG. 1. Referring to FIGS. 1 and 2, a conventional battery cell 10 includes a battery case 20 having an accommodation portion 21 in which a battery assembly 11 is mounted, and a sealing portion 25 formed by sealing an outer periphery thereof. Here, the battery cell 10 includes an electrode lead 30 protruding out of the battery case 20 via the sealing portion 25, and a lead film 40 is located between upper and lower portions of the electrode lead 30 and the sealing portion 25.

However, as the energy density of the battery cell increases in recent years, there is a problem that the amount of gas generated inside the battery cell also increases. In the case of the conventional battery cell 10, a component capable of discharging the gas generated inside the battery cell is not included, so a venting may occur in the battery cell due to gas generation. In addition, moisture may penetrate into the battery cell damaged by the venting, which may cause side reactions, and there is a problem that battery performance deteriorates and additional gas is generated. Accordingly, there is an increasing need to develop a battery cell with improved external emission of gas generated inside the battery cell.

BRIEF SUMMARY OF THE INVENTION

The present disclosure is directed to providing a battery cell with improved external emission of gas generated inside the battery cell, and a battery cell manufacturing apparatus.

The object to be solved by the present disclosure is not limited to the above-mentioned object, and the objects not mentioned here may be clearly understood by those skilled in the art from this specification and the accompanying drawings.

In one aspect of the present disclosure, there is provided a battery cell, comprising: a battery case having an accommodation portion in which an electrode assembly is mounted, and a sealing portion formed by sealing an outer periphery thereof; an electrode lead electrically connected to an electrode tab included in the electrode assembly and protruding out of the battery case via the sealing portion; and a lead film located at a portion corresponding to the sealing portion in at least one of an upper portion and a lower portion of the electrode lead, wherein the lead film has a dented portion that is recessed in an inner direction of the battery case, the dented portion is opened toward the outside of the battery case, the sealing portion located on a gas inlet portion of the dented portion has a recessed sealing portion that is recessed outward from an inner side of the battery case, and the recessed sealing portion does not overlap with at least a part of the gas inlet portion on a plane.

The gas inlet portion of the dented portion may be exposed to the inside of the battery case.

The dented portion may include a first dented portion and a second dented portion, the first dented portion may extend along a protruding direction of the electrode lead, and the second dented portion may extend along a length direction of the sealing portion.

One end of the first dented portion may be opened toward the outside of the battery case, and the other end of the first dented portion may communicate with the second dented portion.

The recessed sealing portion may be located on the second dented portion.

The recessed sealing portion may extend along a length direction of the second dented portion.

A length of the recessed sealing portion may be equal to or greater than a length of the second dented portion.

A width of the recessed sealing portion may be equal to or greater than a width of the second dented portion.

The lead film may have gas permeability of 20 Barrer to 60 Barrer at 60° C.

The lead film may have a moisture penetration amount of 0.02 g to 0.2 g for 10 years at 25° C., 50% RH.

The lead film may contain a polyolefin-based material.

An air ventilation layer may be inserted into the dented portion, and the air ventilation layer may have a material with higher air ventilation than the lead film.

The air ventilation layer may have a thickness of 50 μm to 150 μm.

The air ventilation layer may have gas permeability of 1.6 $e^5$ Barrer to 1.6 $e^7$ Barrer.

The air ventilation layer may include a polyolefin-based resin, a fluorine-based resin, a natural material, a glass fiber, a ceramic fiber, a metal fiber, or two or more thereof.

The lead film and the electrode tab may be spaced apart from each other.

The lead film may further include an inner layer configured to cover at least one of inner surfaces of the dented portion.

A material of the inner layer may have a higher melting point compared to a material of the lead film and may not react with an electrolytic solution.

The inner layer may contain at least one of polyolefin-based materials, fluorine-based materials and porous ceramic-based materials.

Based on a protruding direction of the electrode lead, a width of the lead film surrounding a rear surface of the dented portion may be 2 mm or more.

A thickness of the lead film surrounding an upper surface of the dented portion may be 100 μm to 300 μm.

In another aspect of the present disclosure, there is also provided a battery cell manufacturing apparatus for manufacturing the battery cell described above, comprising: a first sealing tool in which a first sealing surface and a recessed surface are formed, wherein the recessed surface is configured to seal the battery case on at least a part of the gas inlet portion of the dented portion, and the first sealing surface is configured to seal the battery case on the dented portion except for a region sealed by the recessed surface.

The first sealing tool may include a first sealing surface, a recessed surface and a first inclined surface.

The battery cell manufacturing apparatus may further comprise a second sealing tool in which a second sealing surface is formed, and the second sealing surface may be configured to seal the battery case except for a region on the dented portion.

The second sealing tool may include a second sealing surface and a second inclined surface.

A length of the first sealing surface may be shorter than a length of the second sealing surface.

A length of the first sealing surface may extend along a length direction of the dented portion.

A width of the first sealing surface may extend along a width direction of the dented portion.

The first sealing tool and the second sealing tool may be integrated with each other.

According to the embodiments, the present disclosure provides a battery cell, which includes an electrode lead to which a lead film having a dented portion dented inward and opened toward the outside of the battery case is formed, and an apparatus for manufacturing the battery cell, thereby improving the external emission of gas generated inside the battery cell.

In addition, according to the embodiments, in the present disclosure, the sealing portion located on the gas inlet portion of the dented portion includes a recessed sealing portion that is recessed from the inside to the outside of the battery case and does not overlap with at least a part of the gas inlet portion on a plane, thereby improving the external emission of gas generated inside the battery cell.

The effect of the present disclosure is not limited to the above effects, and the effects not mentioned here will be clearly understood by those skilled in the art from this specification and the accompanying drawings.

BRIEF DESCRIPTION OF DRAWINGS

FIG. 4 is a perspective view showing an electrode lead included in the battery cell of FIG. 3.

FIGS. 5(*a*) and (*b*) are cross-sectional views, taken along the axis 5(*a*), (*b*)-5(*a*), (*b*) of FIG. 4.

FIGS. 6(*a*) and (*b*) are cross-sectional views, taken along the axis 6-6 of FIG. 4.

FIG. 7 is an enlarged view showing an electrode lead according to another embodiment of the present disclosure.

FIG. 10(*a*) is a cross-sectional view showing a first sealing tool 1000 according to an embodiment of the present disclosure, and FIG. 10(*b*) is a cross-sectional view showing a first sealing tool 1000 according to another embodiment of the present disclosure.

FIG. 11(*a*) is a cross-sectional view showing a second sealing tool 2000 according to an embodiment of the present disclosure, and FIG. 11(*b*) is a cross-sectional view showing a second sealing tool 2000 according to another embodiment of the present disclosure.

Figure 1:
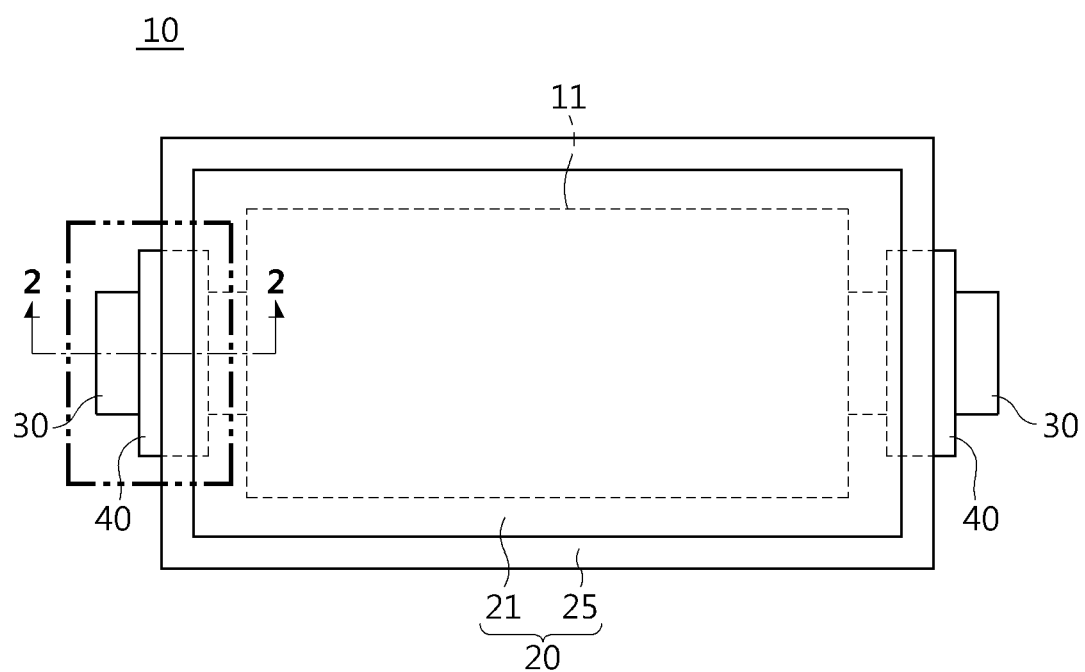
FIG. 1 is a top view showing a conventional battery cell.
Figure 2:
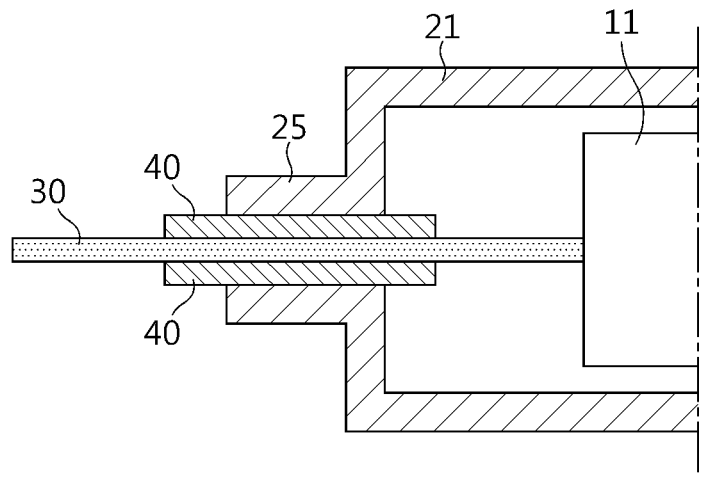
FIG. 2 is a cross-sectional view, taken along the axis 2-2 of FIG. 1.

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, when a part of a layer, a film, a region, a plate, or the like is explained to be "over" or "on" another part, this includes not only the case where it is "directly on" another part, but also the case where still another part is provided therebetween. Conversely, when a part is explained to be "right on" another part, it means that there is no other part therebetween. In addition, when a part is explained to be "over" or "on" a reference part, this means that the part is located on or below the reference part, and it does not mean that the part is located "over" or "on" the reference part in a direction opposite to gravity.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

Hereinafter, a pouch battery cell 100 according to an embodiment of the present disclosure will be described. However, here, the description will be made based on one side surface of both side surfaces of the pouch battery cell 100, but it is not necessarily limited thereto, and the same or similar contents may be described in the case of the other side surface.

Figure 3:
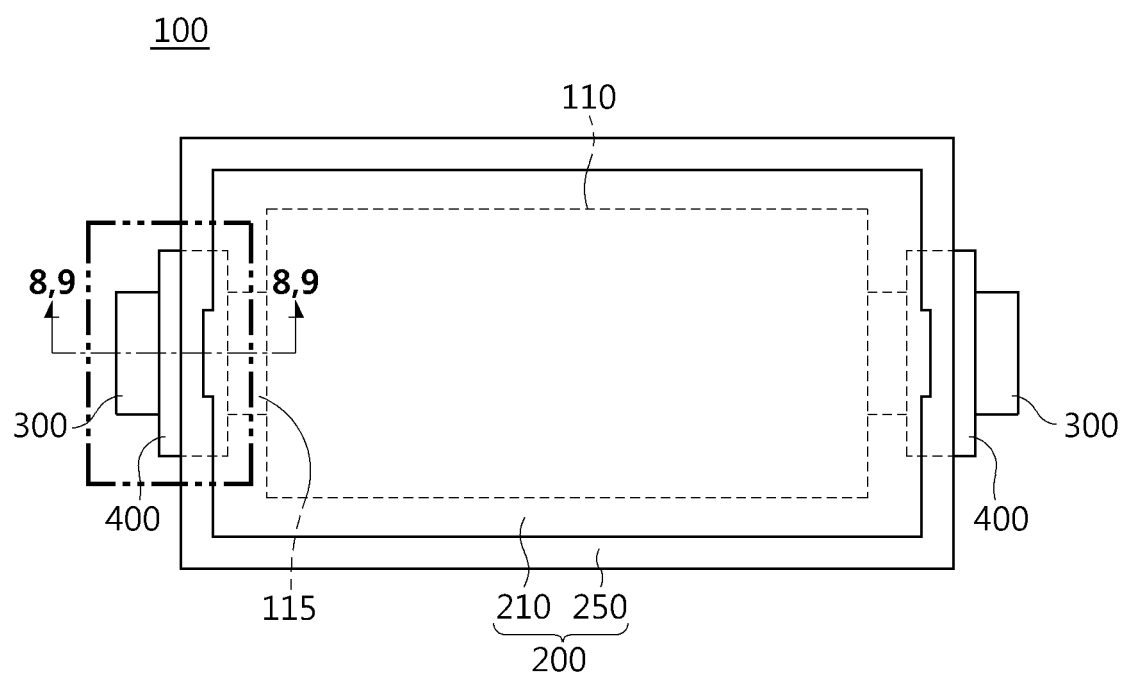
FIG. 3 is a top view showing a battery cell according to an embodiment of the present disclosure.

FIG. 3 is a top view showing a battery cell according to this embodiment.

Referring to FIG. 3, the battery cell 100 according to this embodiment includes a battery case 200, an electrode lead 300, and a lead film 400.

The battery case 200 includes an accommodation portion 210 in which an electrode assembly 110 is mounted, and a sealing portion 250 formed by sealing an outer periphery thereof. The sealing portion 250 may be sealed by heat, laser, or the like. The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

Also, the electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween.

Hereinafter, the electrode lead 300 and the lead film 400 will be mainly described.

FIG. 4 is a perspective view showing an electrode lead included in the battery cell of FIG. 3.

Referring to FIGS. 3 and 4, the electrode lead 300 is electrically connected to an electrode tab 115 included in the electrode assembly 110, and protrudes out of the battery case 200 via the sealing portion 250. In addition, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during sealing.

FIGS. 5(a) and (b) are cross-sectional views, taken along the axis 5(a), (b)-5(a), (b) of FIG. 4. FIGS. 6(a), (b) are cross-sectional views, taken along the axis 6(a), (b)-6(a), (b) of FIG. 4.

Referring to FIGS. 5(a), (b) and 6(a), (b), the lead film 400 has a dented portion 450 that is recessed in an inner direction of the battery case 200, and the dented portion 450 is opened toward the outside of the battery case 200. In addition, the inner surface of the dented portion 450 may be closed based on the protruding direction of the electrode lead 300.

In addition, referring to FIGS. 5 and 6, the lead film 400 may further include an inner layer 410 covering at least one of the inner surfaces of the dented portion 450.

For example, referring to FIGS. 5(a) and 6(a), the inner layer 410 in the dented portion 450 may cover the entire surface of the lead film 400. That is, the inner layer 410 may be formed on the entire inner surface of the dented portion 450, except for the opened surface.

Accordingly, even if the lead film 400 is sealed together with the sealing portion 250 in a state of being located in at least one of the upper and lower portions of the electrode lead 300, the dented portion 450 may be preserved in a non-sealed state by the inner layer 410.

As another example, referring to FIGS. 5(b) and 6(b), the inner layer 410 may cover an upper surface or a lower surface among the inner surfaces of the dented portion 450. That is, the dented portion 450 may have an inner layer 410 formed on at least one of the upper and lower surfaces facing each other.

Accordingly, while the lead film 400 minimizes the inner layer 410 formed in the dented portion 450, the dented portion 450 may be preserved in a non-sealed state by the inner layer 410. In addition, the manufacturing process may be simplified and the cost may be reduced.

More specifically, the inner layer 410 may be made of a material having a higher melting point compared to the material constituting the lead film 400. In addition, the inner layer 410 may be made of a material that does not react with the electrolytic solution contained in the battery case 200. Accordingly, since the inner layer 410 is made of the above-described material, the inner layer 410 does not separately react with the electrolytic solution and does not cause heat fusion, thermal deformation, or the like in the high-temperature sealing process, so that the dented portion 450 may be kept blank. In addition, the gas generated in the battery case 200 may be easily discharged to the outside.

In one embodiment of the present disclosure, the thickness of the inner layer 410 may be 100 μm or less.

In one embodiment of the present disclosure, the gas permeability of the inner layer 410 may be 40 Barrer or more. For example, the carbon dioxide permeability of the inner layer 410 may satisfy the above range.

For example, the lead film 400 may include a polyolefin-based material, and the inner layer 410 may include at least one of polyolefin-based materials, fluorine-based materials, and porous ceramic-based materials. For example, the inner layer 410 may include at least one of polyolefin-based materials, fluorine-based materials, and porous ceramic-based materials that satisfies the above gas permeability value. The polyolefin-based material may include at least one material selected from the group consisting of polypropylene, polyethylene, and polyvinyl difluoride (PVDF). The fluorine-based material may include at least one material selected from the group consisting of polytetrafluoroethylene and polyvinylidene fluoride. In addition, the inner layer 410 may include a getter material, so that gas permeability may be increased while water permeability may be minimized As an example, the getter material may be calcium oxide (CaO), barium oxide (BaO), lithium chloride (LiCl), silica ($SiO_2$), or the like, and any material reacting with water ($H_2O$) can be used without being limited thereto.

The inner layer 410 may have an adhesive material between the lead film 400 and the inner layer 410 or may be extruded together with the lead film 400 and adhered to the lead film 400. The adhesive material may include an acryl-based material. In particular, when the inner layer 410 is extruded together with the lead film 400, the gas permeability of the inner layer 410 may be 40 Barrer or more.

Referring to FIGS. 4 to 6(a), (b), the lead film 400 may include a first lead film and a second lead film, the first lead film may be located at an upper portion of the electrode lead 300, and the second lead film may be located at a lower portion of the electrode lead 300. At this time, the electrode lead 300 may be sealed together with the sealing portion 250 in a state of being located between the first lead film and the second lead film, so that the first lead film and the second lead film may be connected to each other.

Accordingly, the lead film 400 may prevent the side surface of the electrode lead 300 from being exposed to the outside, while improving the sealing properties of the sealing portion 250 and the electrode lead 300.

For example, in the lead film 400, the dented portion 450 may be located in at least one of the first lead film and the second lead film. More specifically, in the lead film 400, the dented portion 450 may be formed in the first lead film or the second lead film based on the electrode lead 300, or the dented portion 450 may be formed in both the first lead film and the second lead film based on the electrode lead 300. However, the number of the dented portion 450 is not limited to the above, and the lead film 400 may be formed in an appropriate number.

Accordingly, by adjusting the number of the dented portions 450 formed in the lead film 400, the durability and airtightness of the lead film 400 may be controlled. In addition, by minimizing the number of the dented portion 450 as necessary, it is possible to simplify the manufacturing process and reduce the cost.

In one embodiment of the present disclosure, the gas permeability of the lead film 400 may be 20 Barrer to 60 Barrer, or 30 Barrer to 40 Barrer at 60° C. For example, the carbon dioxide permeability of the lead film 400 may satisfy the above range. In addition, the gas permeability may satisfy the above range at 60° C. based on the thickness of the lead film 400 of 200 μm. If the gas permeability of the lead film 400 satisfies the above range, the gas generated inside the secondary battery may be more effectively discharged.

In this specification, the gas permeability may be measured by ASTM F2476-20.

In one embodiment of the present disclosure, the moisture penetration amount of the lead film 400 may be 0.02 g to 0.2 g, or 0.02 g to 0.04 g, or 0.06 g, or 0.15 g for 10 years at 25° C., 50% RH. If the moisture penetration amount of the lead film 400 satisfies the above range, the penetration of moisture from the lead film 400 may be more effectively prevented.

In this embodiment, the moisture penetration amount may be measured by adopting the ASTM F 1249 method. At this time, the moisture penetration amount may be measured using equipment officially certified by MCOON.

In one embodiment of the present disclosure, the lead film 400 may have a gas permeability of 20 Barrer to 60 Barrer at 60° C. and a moisture penetration amount of 0.02 g to 0.2 g at 25° C., 50% RH for 10 years. If the gas permeability and the moisture penetration amount of the lead film 400 satisfy the above ranges, the penetration of moisture from the outside may be more effectively prevented while discharging the gas generated inside the secondary battery.

In one embodiment of the present disclosure, the lead film 400 may include a polyolefin-based resin. For example, the lead film 400 may include a polyolefin-based resin satisfying the gas permeability and/or moisture penetration amount values described above. The polyolefin-based resin may include at least one material selected from the group consisting of polypropylene, polyethylene, and polyvinyl difluoride (PVDF). While the lead film 400 contains polypropylene, the gas permeability of the lead film 400 may be 20 Barrer to 60 Barrer at 60° C. Also, the moisture penetration amount may be 0.06 g to 0.15 g. In this case, the gas generated inside the secondary battery may be more effectively discharged, and the penetration of moisture from the outside may be easily prevented.

In addition, since the lead film 400 is made of the above-described material, the lead film 400 may maintain the airtightness of the battery cell 100 and prevent leakage of the internal electrolytic solution.

FIG. 7 is an enlarged view showing an electrode lead according to another embodiment of the present disclosure.

Referring to FIG. 7, the battery cell 100 according to an embodiment of the present disclosure has a recessed sealing portion 250H formed inside the sealing portion 250. Here, the recessed sealing portion 250H is recessed outward from the inside of the battery case 200. More specifically, the recessed sealing portion 250H is recessed outward from the inside of the accommodation portion 210.

In addition, the recessed sealing portion 250H is located on a gas inlet portion of the dented portion 450.

Referring to FIG. 7, the sealing portion 250 does not overlap with at least a part of the gas inlet portion on a plane. Here, when at least a part of the gas inlet portion and the sealing portion 250 do not overlap on a plane, it means that at least a part of the gas inlet portion and the sealing portion 250 do not overlap when the battery case 200 is viewed from the above. Since the recessed sealing portion 250H is located on the gas inlet portion of the dented portion 450, it is possible to avoid interference between the gas inlet portion of the dented portion 450 and the sealing portion 250 in the lead film 400, so that the gas inside the battery case 200 may easily flow into the dented portion 450.

Referring to FIG. 7, the dented portion 450 may include a first dented portion 451 and a second dented portion 455. The first dented portion 451 may extend along the protruding direction of the electrode lead 300, and the second dented portion 455 may extend along the length direction of the sealing portion 250. Here, the length direction of the sealing portion 250 refers to a direction orthogonal to the protruding direction of the electrode lead 300.

However, the shape of the dented portion 450 is not limited to the above, and the dented portion 450 may be formed in an appropriate shape within the lead film 400.

Here, one end of the first dented portion 451 may be opened toward the outside of the battery case 200, and the other end of the first dented portion 451 may communicate with the second dented portion 455. More specifically, the first dented portion 451 and the second dented portion 455 may be integrated with each other. That is, the second dented portion 455 may serve as a gas inlet through which the gas generated in the battery case 200 is introduced, and the first dented portion 451 may serve as a gas outlet through which the gas introduced into the second dented portion 455 is discharged to the outside.

Also, referring to FIG. 7, the recessed sealing portion 250H may be positioned on the second dented portion 455. As another example, the recessed sealing portion 250H may also be positioned on a boundary line between the first dented portion 451 and the second dented portion 455.

More specifically, the recessed sealing portion 250H may extend along the length direction of the second dented portion 455. Here, the length of the second dented portion 455 means a maximum value of the distance between one end and the other end of the second dented portion 455 in a direction orthogonal to the protruding direction of the electrode lead 300. In addition, the length of the recessed sealing portion 250H may be equal to or greater than the length of the second dented portion 455. Here, the length of the recessed sealing portion 250H means a maximum value of the distance between one end and the other end of the recessed sealing portion 250H in a direction orthogonal to the protruding direction of the electrode lead 300.

In addition, the width of the recessed sealing portion 250H may be equal to or greater than the width of the second dented portion 455. Here, the width of the second dented portion 455 means a maximum value of the distance between one end and the other end of the second dented portion 455 in the protruding direction of the electrode lead 300, and the width of the recessed sealing portion 250H means a maximum value of the distance between one end and the other end of the recessed sealing portion 250H in the protruding direction of the electrode lead 300. However, the size of the recessed sealing portion 250H is not limited to the above, and the recessed sealing portion 250H may be formed in an appropriate size within the lead film 400.

Accordingly, in the lead film 400, the second dented portion 455 on the lead film 400 may not be in contact with the sealing portion 250. In other words, a region of the lead film 400 where the second dented portion 455 is located may avoid interference with the sealing portion 250. Accordingly, the second dented portion 455 may be exposed to the inside of the battery case 200. Since the second dented portion 455 serves as a gas inlet through which the gas generated in the battery case 200 is introduced, the area in which the second dented portion 455 is exposed to the inside of the battery case 200 within the lead film 400 increases, so that gas may be smoothly introduced into the second dented portion 455 from the inside of the battery case 200.

Referring to FIG. 7, in the lead film 400, the dented portion 450 may be formed at various positions with respect to the electrode lead 300.

Figure 8:
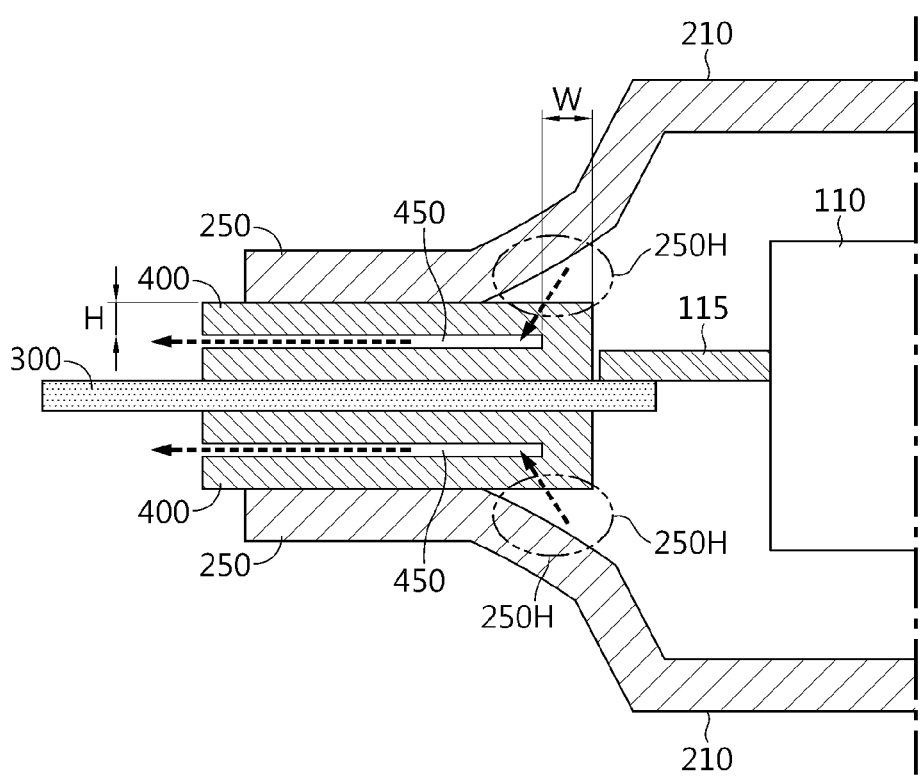
FIG. 8 is a cross-sectional view, taken along the axis 8-8 of FIG. 3.

For example, as shown in FIG. 8, in the lead film 400, the dented portion 450 may be located over the electrode lead 300. More specifically, the dented portion 450 may be formed at a position corresponding to the center of the electrode lead 300.

As another example, as shown in FIG. 8(b), the length of the lead film 400 may be greater than the width of the electrode lead 300, and the dented portion 450 may be located between the end of the electrode lead 300 and the end of the lead film 400. Here, the length of the lead film 400 means a maximum value of the distance between one end and the other end of the lead film 400 in a direction orthogonal to the protruding direction of the electrode lead 300, and the width of the electrode lead 300 means a maximum value of the distance between one end and the other end of the electrode lead 300 in a direction orthogonal to the protruding direction of the electrode lead 300. In other words, in the lead film 400, the dented portion 450 may be formed at a position avoiding the electrode lead 300. However, the position of the dented portion 450 is not limited to the above, and the dented portion 450 may be formed at an appropriate position within the lead film 400.

Accordingly, by adjusting the position of the dented portion 450 formed in the lead film 400, the durability and airtightness of the lead film 400 may be controlled. In addition, if necessary, by adjusting the size of the dented portion 450 according to the position of the dented portion 450, it is possible to simplify the manufacturing process and reduce the cost.

In addition, referring to FIGS. 3 and 7, according to this embodiment, the lead film 400 and the electrode tab 115 may be spaced apart from each other based on the electrode lead 300. Since the lead film 400 on the recessed end of the dented portion 450 does not come into contact with the sealing portion 250, the lead film 400 may be designed to have a shorter width than the conventional one, so the lead film 400 and the electrode tab 115 may be sufficiently spaced apart from each other. Here, the width of the lead film 400 refers to a maximum value of the distance between one end and the other end of the lead film in the protruding direction of the electrode lead 300.

Accordingly, it is possible to prevent a step from being created as the lead film 400 and the electrode tab 115 overlap with each other, and it is also possible to prevent poor adhesion performance from occurring due to the step and to prevent the battery cell 100 from being damaged at high pressure.

FIG. 8 is a cross-sectional view, taken along the axis 8-8 kof FIG. 3.

Referring to FIG. 8, the gas generated inside the battery cell 100 may be discharged toward the dented portion 450 of the lead film 400. Here, the internal pressure of the battery cell 100 is higher than the internal pressure of the dented portion 450, and the resulting pressure difference may act as a driving force of the gas. Here, since the dented portion 450 is opened toward the outside, the pressure inside the dented portion 450 may be the same as the pressure outside.

Accordingly, the gas generated inside the battery cell 100 may be discharged toward the dented portion 450, and the gas introduced into the dented portion 450 may be easily discharged toward the outside. In addition, the external emission of gas generated inside the battery cell 100 may also be increased.

In addition, since the dented portion 450 is recessed in the inner direction of the battery case 200 and is opened toward the outside of the battery case 200, the dented portion 450 may not be exposed to the electrolytic solution inside the battery case 200, and airtightness and durability of the pouch may also be secured.

At this time, the recessed end of the dented portion 450 may serve as a gas inlet through which the gas generated in the battery case 200 is introduced, and the end of the dented portion 450 that is open toward the outside of the battery case 200 may serve as a gas outlet through which the gas introduced into the dented portion 450 is discharged to the outside.

Referring to FIG. 8, the thickness H of the lead film 400 surrounding the upper surface of the dented portion 450 may be 100 μm to 300 μm, or 100 μm to 200 μm. In this specification, if the thickness H of the lead film 400 surrounding the upper surface of the dented portion 450 satisfies the above range, the gas inside the battery case 200 may be more easily introduced into the dented portion 450. In this specification, the lead film 400 surrounding the upper surface of the dented portion 450 refers to the lead film 400 between the dented portion 450 and the electrode lead 300.

Referring to FIG. 8, based on the protruding direction of the electrode lead 300, the width W of the lead film 400 surrounding the rear surface of the dented portion 450 may be 2 mm or more, or 2 mm to 3 mm. Here, the width of the lead film 400 surrounding the rear surface of the dented portion 450 means a maximum value of the distance between the recessed end of the dented portion 450 and the inner end of the battery case 200 of the lead film 400. If the width W of the lead film 400 surrounding the rear surface of the dented portion 450 satisfies the above range, it may be more easy to prevent the lead film 400 from being torn while the gas generated inside the battery case 200 is introduced into the dented portion 450.

If the sealing portion 250 comes into contact with the gas inlet portion when the gas generated in the battery case 200 flows into the dented portion 450, the inflow of gas from the inside of the battery case 200 into the dented portion 450 may be disturbed by the sealing portion 250. Accordingly, there is a problem in that the amount of gas flowing into the dented portion 450 is greatly reduced. For example, in the lead film 400, the gas inside the battery case 200 may be introduced into the dented portion 450 due to gas permeation on the lead film at the upper surface of the recessed end of the dented portion 450. Here, if the lead film on the upper surface of the recessed end of the dented portion 450 comes into contact with the sealing portion 250, the inflow of gas from the inside of the battery case 200 into the dented portion 450 may be disturbed by the sealing portion 250.

Referring to FIG. 8, the recessed sealing portion 250H is positioned on the gas inlet portion of the dented portion 450, and thus it is possible to avoid interference between the gas inlet portion of the dented portion 450 and the sealing portion 250 in the lead film 400.

In addition, in the lead film 400, the gas inlet portion of the dented portion 450 may be exposed to the inside of the battery case 200. In this specification, the inside of the battery case 200 means a space in the inner direction of the battery case 200 rather than the end of the sealing portion 250 at the inner side of the battery case. That is, in the lead film 400, since the area in which the gas inlet portion of the dented portion 450 is exposed to the inside of the battery case 200 is increased, gas may be smoothly introduced into the dented portion 450 from the inside of the battery case 200.

Figure 9:
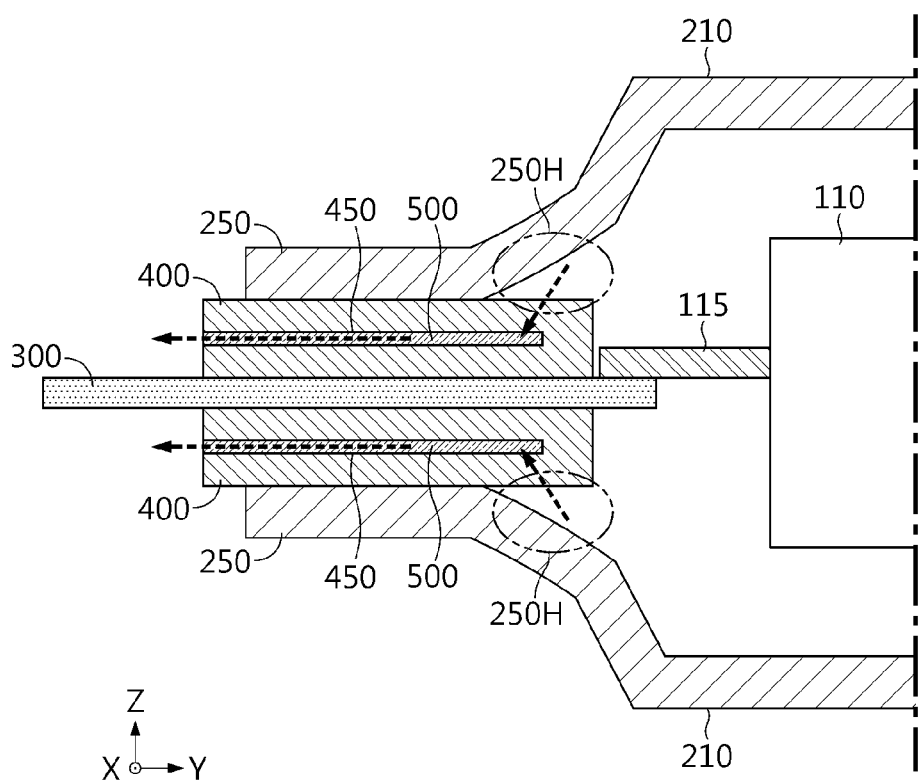
FIG. 9 is a cross-sectional view, taken along the axis 9-9 of FIG. 3, in still another embodiment of the present disclosure.

FIG. 9 is a cross-sectional view, taken along the axis 9-9 of FIG. 3, in still another embodiment of the present disclosure.

Referring to FIG. 9, an air ventilation layer 500 may be inserted in the dented portion 450. The air ventilation layer 500 contains a material with higher air ventilation than the lead film 400. Higher air ventilation may mean that, when a gas having a predetermined pressure is transmitted in one direction, the amount of the transmitted gas is relatively larger. If the air ventilation layer 500 is inserted in the dented portion 450, the gas generated inside the battery case 200 and introduced into the dented portion 450 may be discharged to the outside of the battery case 200 by the air ventilation layer 500 having high ventilation even if the pressure does not exceed a predetermined level, and thus the gas inside the cell may be more easily discharged to the outside of the cell.

For example, the air ventilation layer 500 may include a material that is more porous than the lead film 400. That is, the air ventilation layer 500 may include a material having a higher ratio of pores per unit volume than the lead film 400.

In one embodiment of the present disclosure, the gas permeability of the air ventilation layer 500 may be $1.6\ e^5$ Barrer to $1.6\ e^7$ Barrer, or $1\ e^6$ Barrer to $3\ e^6$ Barrer. For example, the carbon dioxide permeability of the air ventilation layer 500 may satisfy the above range.

In one embodiment of the present disclosure, the air ventilation layer 500 may include at least one material selected from the group consisting of a polyolefin-based resin, a fluorine-based resin, a natural material, a glass fiber, a ceramic fiber, and a metal fiber. For example, the air ventilation layer 500 may include at least one material selected from the group consisting of a polyolefin-based resin, a fluorine-based resin, a natural material, glass fiber, a ceramic fiber, and a metal fiber that satisfy the gas permeability described. The polyolefin-based resin may include at least one material selected from the group consisting of polypropylene, polyethylene, and polyvinyl difluoride (PVDF). The fluorine-based resin may include at least one material selected from the group consisting of polytetrafluoroethylene and polyvinylidene fluoride, and the natural material may include at least one material selected from the group consisting of cotton and wool.

In one embodiment of the present disclosure, the thickness of the air ventilation layer 500 may be 50 μm to 150 μm, or 50 μm to 100 μm. If the thickness of the air ventilation layer 500 satisfies the above range, the gas inside the battery case 200 may be more easily discharged to the outside of the battery case 200.

Figure 10:
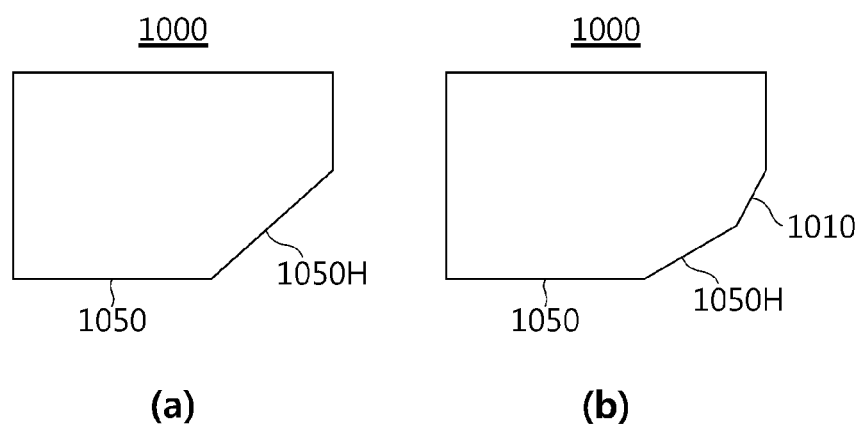
FIGS. 10(*a*) and (*b*) are cross-sectional views showing a battery cell manufacturing apparatus according to another embodiment of the present disclosure.

FIGS. 10(a), (b) are cross-sectional views showing a battery cell manufacturing apparatus according to another embodiment of the present disclosure. FIG. 10(a) is a cross-sectional view showing a first sealing tool 1000 according to an embodiment of the present disclosure, and FIG. 10(b) is a cross-sectional view showing a first sealing tool 1000 according to another embodiment of the present disclosure.

Referring to FIG. 10(a), the battery cell manufacturing apparatus according to this embodiment is an apparatus for manufacturing the battery cell 100, and includes a first sealing tool 1000 in which a first sealing surface 1050 and a recessed surface 1050H are formed.

The recessed surface 1050H seals the battery case 200 on at least a part of the gas inlet portion of the dented portion 450. Accordingly, the recessed sealing portion 250H may be formed.

The first sealing surface 1050 seals the battery case 200 on the dented portion 450 except for the region sealed by the recessed surface 1050H.

By using the first sealing tool 1000, it is possible to form the recessed sealing portion 250H by the recessed surface 1050H while maintaining the sealing property or adhesion performance between the sealing portion 250 and the lead film 400. The shape of the recessed surface 1050H is not limited thereto, and the recessed surface 1050H may have a structure recessed in a rectangular shape, a semi-circular shape, or the like having a size capable of maintaining the sealing property of the battery case 200.

In one embodiment of the present disclosure, the length of the first sealing surface 1050 may extend along the length direction of the dented portion 450. However, the first sealing surface 1050 does not extend to the gas inlet portion of the dented portion 450. Here, the length of the first sealing surface 1050 means a maximum value of the distance between one end and the other end of the first sealing surface 1050 in the protruding direction of the electrode lead 300, and the length of the dented portion 450 means a maximum value of the distance between one end and the other end of the dented portion 450 in the protruding direction of the electrode lead 300.

In addition, the width of the first sealing surface 1050 may extend along the width direction of the dented portion 450. Here, the width of the first sealing surface 1050 means a maximum value of the distance between one end and the other end of the first sealing surface 1050 in a direction orthogonal to the protruding direction of the electrode lead 300, and the width of the dented portion 450 means a maximum value of the distance between one end and the other end of the dented portion 450 in a direction orthogonal to the protruding direction of the electrode lead 300. The width of the first sealing surface 1050 may be equal to or greater than the width of the dented portion 450.

Referring to FIG. 10(b), the first sealing tool 1000 may include a first sealing surface 1050, a recessed surface 1050H, and a first inclined surface 1010.

Referring to FIG. 10(b), the recessed surface 1050H may be formed as an inclined surface, like the first inclined surface 1010, but the inclination angle of the recessed surface 1050H may be smaller than the inclination angle of the first inclined surface 1010.

Figure 11:
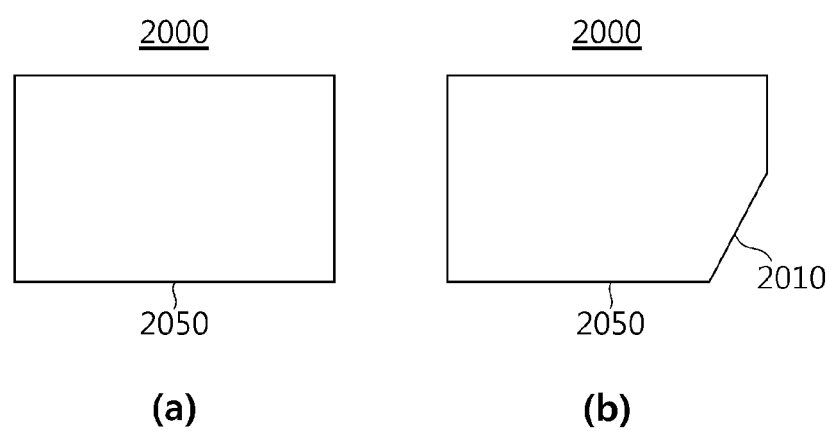
FIGS. 11(*a*) and (*b*) are cross-sectional views showing a battery cell manufacturing apparatus according to another embodiment of the present disclosure.

FIGS. 11(a) and (b) are cross-sectional views showing a battery cell manufacturing apparatus according to another embodiment of the present disclosure. FIG. 11(a) is a cross-sectional view showing a second sealing tool 2000 according to an embodiment of the present disclosure, and FIG. 11(b) is a cross-sectional view showing a second sealing tool 2000 according to another embodiment of the present disclosure.

Referring to FIG. 11(a), the battery cell manufacturing apparatus according to the present embodiment may further include a second sealing tool 2000 in which a second sealing surface 2050 is formed.

The second sealing surface 2050 seals the battery case 200 except for the region on the dented portion 450. Accordingly, even if the dented portion 450 is located in the lead film 400, a portion of the lead film 400 where the dented portion 450 is not located and the sealing portion 250 may be sealed with each other, so that the sealing force of the battery case 200 may be improved by the second sealing tool 2000.

In one embodiment of the present disclosure, the length of the first sealing surface 1050 may be shorter than the length of the second sealing surface 2050. That is, the length of the sealing portion 250 formed by the first sealing surface 1050 may be shorter than the length of the sealing portion 250 formed by the second sealing surface 2050. Accordingly, the sealing portion 250 is not positioned on the gas inlet portion of the dented portion 450, so that gas may be smoothly introduced into the dented portion 450 from the inside of the battery case 200.

Referring to FIG. 11(b), the second sealing tool 2000 may include a second sealing surface 2050, and a second inclined surface 2010.

In one embodiment of the present disclosure, the inclination angle of the first inclined surface 1010 may be identical or similar to the inclination angle of the second inclined surface 2010. Accordingly, the inclination angles of the outer surfaces of the accommodation portion 210 respectively in contact with the first inclined surface 1010 and the second inclined surface 2010 may be identical or similar to each other.

In one embodiment of the present disclosure, the first sealing tool 1000 and the second sealing tool 2000 may be integrated with each other. For example, the first sealing tool 1000 and the pair of second sealing tools 2000 are integrated, and the first sealing tool 1000 may be located between the pair of second sealing tools 2000. Here, depending on the position of the dented portion 450, the pair of second sealing tools 2000 may have the same width or different widths.

Accordingly, depending on the position of the dented portion 450, the first sealing tool 1000 and the second sealing tool 2000 are integrated, thereby simplifying the manufacturing process of the battery cell 100 and reducing the cost.

Figure 12:
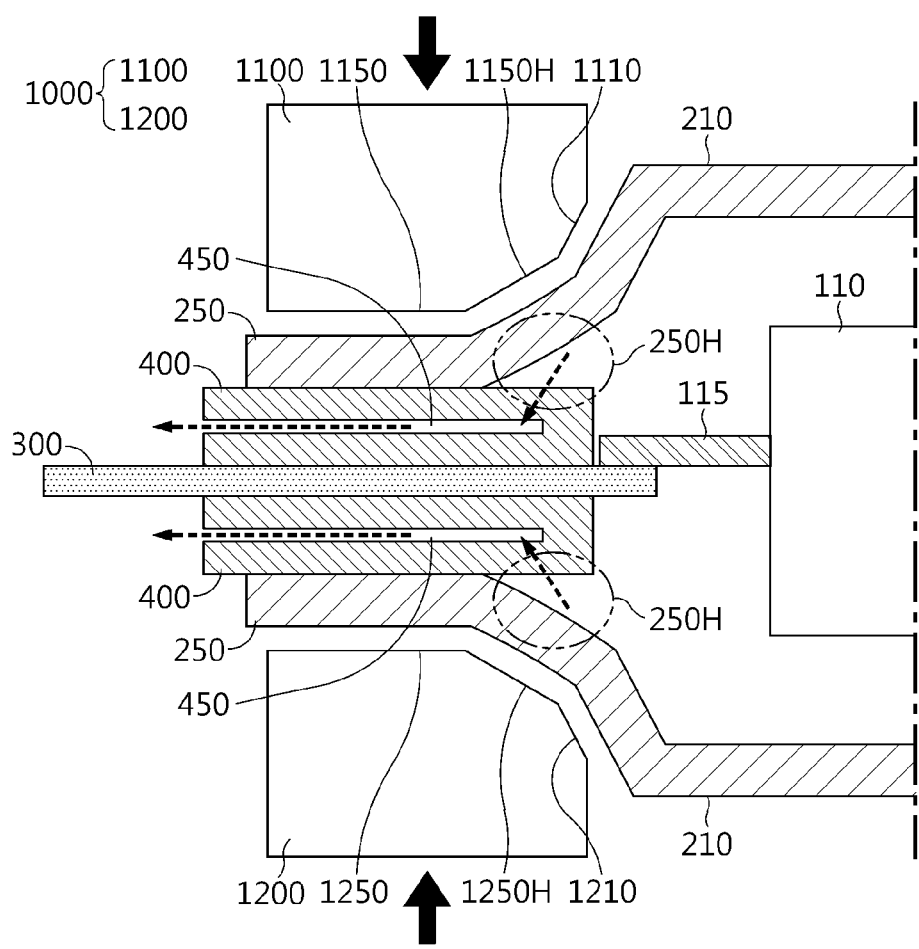
FIG. 12 is a cross-sectional view, taken along the axis 12-12 of FIG. 7, showing the battery cell manufactured by the battery cell manufacturing apparatus of FIG. 10(*b*).

FIG. 12 is a cross-sectional view, taken along the axis 12-12 of FIG. 7, showing the battery cell manufactured by the battery cell manufacturing apparatus of FIG. 10(b).

Referring to FIGS. 10(b) and 12, the first sealing tool 1000 may include a first upper sealing tool 1100 and a first lower sealing tool 1200. In addition, the first upper sealing tool 1100 includes a first upper inclined surface 1110, a first upper sealing surface 1150 and an upper recessed surface 1150H formed therein, and the first lower sealing tool 1200 includes a first lower inclined surface 1210, a first lower sealing surface 1250 and a lower recessed surface 1250H formed therein. Here, the first upper sealing tool 1100 is located at the upper part, and the first lower sealing tool 1200 is located at the lower part, based on the sealing portion 250. Here, the following description is based on the first upper sealing tool 1100, but the same description may also be applied to the first lower sealing tool 1200.

More specifically, in the first upper sealing tool 1100, the upper recessed surface 1150H may be located on at least a part of the gas inlet portion of the dented portion 450, and the first upper sealing surface 1150 may be located on the battery case 200 on the dented portion 450 except for the region sealed by the upper recessed surface 1150H. That is, the upper recessed surface 1150H may be in contact with the outer surface of the accommodation portion 210 to form the recessed sealing portion 250H on the lead film in which the gas inlet portion of the dented portion 450 is positioned. In addition, the first upper sealing surface 1150 may be in contact with the sealing portion 250 to seal the battery case 200.

For example, when the dented portion 450 includes the first dented portion 451 and the second dented portion 455 as shown in FIG. 7, the length of the first upper sealing surface 1150 may extend along the length direction of the first dented portion 451, and the length of the upper recessed surface 1150H may extend along the width direction of the second dented portion 455. Here, the length of the first upper sealing surface 1150 means a maximum value of the distance between one end and the other end of the first upper sealing surface 1150 based on the protruding direction of the electrode lead 300, and the length of the first dented portion 451 means a maximum value of the distance between one end and the other end of the first dented portion 451 based on the protruding direction of the electrode lead 300. In addition, the length of the upper recessed surface 1150H means a maximum value of the distance between one end and the other end of the upper recessed surface 1150H based on the protruding direction of the electrode lead 300.

In addition, the widths of the first upper sealing surface 1150 and the upper recessed surface 1150H may extend along the length direction of the second dented portion 455. Here, the width of the first upper sealing surface 1150 means a maximum value of the distance between one end and the other end of the first upper sealing surface 1150 in a direction orthogonal to the protruding direction of the electrode lead 300, and the width of the upper recessed surface 1150H means a maximum value of the distance between one end and the other end of the upper recessed surface 1150H in a direction orthogonal to the protruding direction of the electrode lead 300.

Accordingly, in the manufacturing apparatus according to the present embodiment, the recessed sealing portion 250H may be formed on the region where the gas inlet of the dented portion 450 is located, by the first sealing tool 1000. Accordingly, gas may be smoothly introduced into the dented portion 450 from the inside of the battery case 200.

Figure 13:
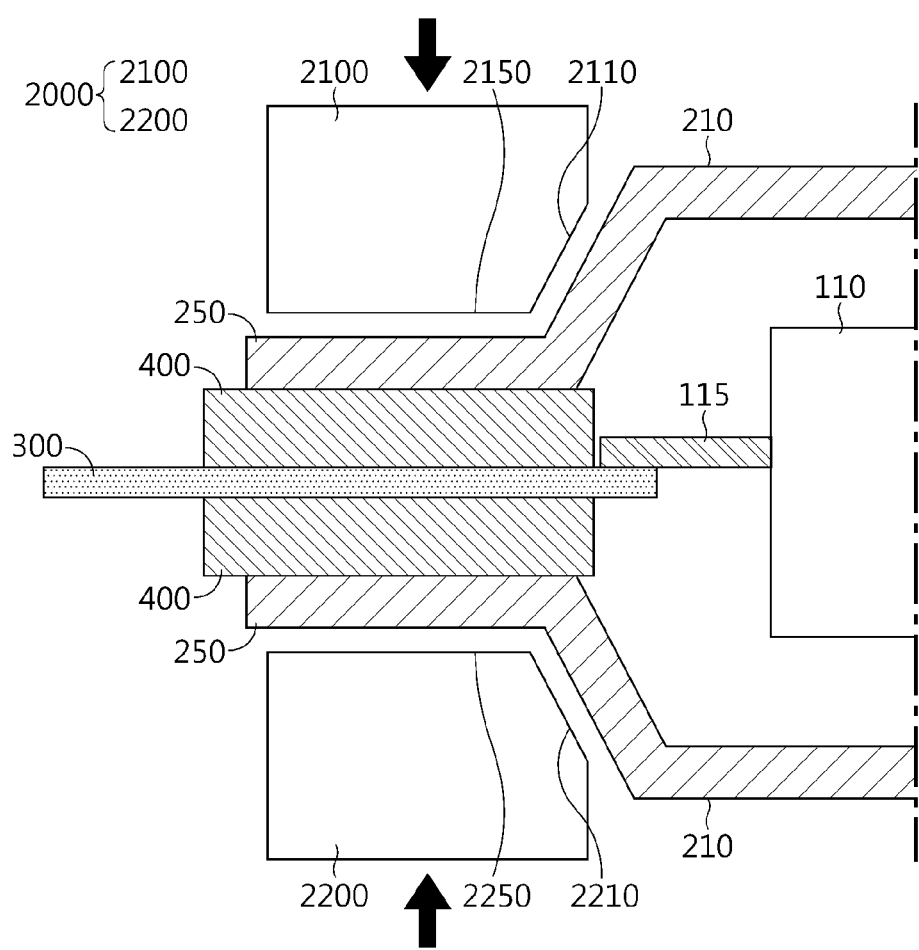
FIG. 13 is a cross-sectional view, taken along the axis 13-13 of FIG. 7, showing the battery cell manufactured by the battery cell manufacturing apparatus of FIG. 10(*b*).

FIG. 13 is a cross-sectional view, taken along the axis 13-13 of FIG. 7, showing the battery cell manufactured by the battery cell manufacturing apparatus of FIG. 10(b).

Referring to FIGS. 11(b) and 13, the second sealing tool 2000 may include a second upper sealing tool 2100 and a second lower sealing tool 2200. In addition, the second upper sealing tool 2100 includes a second upper inclined surface 2110 and a second upper sealing surface 2150 formed therein, and the second lower sealing tool 2200 includes a second lower inclined surface 2210 and a second lower sealing surface 2250 formed therein. The second upper sealing tool 2100 is located at an upper side and the second lower sealing tool 2200 is located at a lower side, based on the sealing portion 250. Here, the following description will be based on the second upper sealing tool 2100, but the same description may also be applied to the second lower sealing tool 2200.

More specifically, in the second upper sealing tool 2100, the second upper sealing surface 2150 may be located on the region of the sealing portion 250 where the dented portion 450 is not located. That is, in the second sealing tool 2000, the second sealing surface 2050 may be located on the battery case 200 except for the region on the dented portion 450 based on the lead film 400, so that the lead film 400 and the sealing portion 250 may be sealed.

Accordingly, even if the dented portion 450 is located in the lead film 400, the region of the lead film 400 where the dented portion 450 is not located and the sealing portion 250 may be sealed with each other, so that the sealing force of the battery case 200 may be improved by the second sealing tool 2000.

A battery module according to another embodiment of the present disclosure includes the battery cell described above. Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

Although the preferred embodiment of the present disclosure has been described in detail above, the scope of the right of the present disclosure is not limited thereto, and various modifications and improvements made by those skilled in the art using the basic concept of the present disclosure defined in the appended claims also fall within the scope of the right of the present disclosure.

What is claimed is:

1. A battery cell, comprising:
   a battery case having an accommodation portion in which an electrode assembly is mounted, and a sealing portion formed by sealing an outer periphery thereof;
   an electrode lead electrically connected to an electrode tab included in the electrode assembly and protruding out of the battery case via the sealing portion; and
   a lead film located at a portion corresponding to the sealing portion in at least one of an upper portion and a lower portion of the electrode lead,
   wherein the lead film has a dented portion that is recessed in an inner direction of the battery case,
   the dented portion is opened toward the outside of the battery case,
   the sealing portion located on a gas inlet portion of the dented portion has a recessed sealing portion that is recessed outward from an inner side of the battery case, and
   the recessed sealing portion does not overlap with at least a part of the gas inlet portion on a plane.

2. The battery cell according to claim 1,
   wherein the gas inlet portion of the dented portion is exposed to an inside of the battery case.

3. The battery cell according to claim 1,
   wherein the dented portion includes a first dented portion and a second dented portion,
   the first dented portion extends along a protruding direction of the electrode lead, and
   the second dented portion extends along a length direction of the sealing portion.

4. The battery cell according to claim 3,
   wherein one end of the first dented portion is opened toward the outside of the battery case, and the other end of the first dented portion communicates with the second dented portion.

5. The battery cell according to claim 3,
   wherein the recessed sealing portion is located on the second dented portion.

6. The battery cell according to claim 5,
   wherein the recessed sealing portion extends along a length direction of the second dented portion.

7. The battery cell according to claim 6,
   wherein a length of the recessed sealing portion is equal to or greater than a length of the second dented portion.

8. The battery cell according to claim 5,
   wherein a width of the recessed sealing portion is equal to or greater than a width of the second dented portion.

9. The battery cell according to claim 1,
   wherein the lead film contains a polyolefin-based material.

10. The battery cell according to claim 1,
    wherein the dented portion comprises an air ventilation layer, and
    the air ventilation layer has a material with higher air ventilation than the lead film.

11. The battery cell according to claim 10,
    wherein the air ventilation layer includes a polyolefin-based resin, a fluorine-based resin, a natural material, a glass fiber, a ceramic fiber, a metal fiber, or two or more thereof.

12. The battery cell according to claim 1,
    wherein the lead film and the electrode tab are spaced apart from each other.

13. The battery cell according to claim 1,
    wherein the lead film further includes an inner layer configured to cover at least one of inner surfaces of the dented portion.

14. The battery cell according to claim 13,
    wherein a material of the inner layer has a higher melting point compared to a material of the lead film and does not react with an electrolytic solution.

15. The battery cell according to claim 14,
    wherein the inner layer contains at least one of polyolefin-based materials, fluorine-based materials and porous ceramic-based materials.

16. A battery cell manufacturing apparatus for manufacturing the battery cell according to claim 1, comprising:
    a first sealing tool comprising a first sealing surface and a recessed surface, wherein the recessed surface is configured to seal the battery case on at least a part of the gas inlet portion of the dented portion, and the first sealing surface is configured to seal the battery case on the dented portion except for a region sealed by the recessed surface.

17. The battery cell manufacturing apparatus according to claim 16, wherein the first sealing tool includes a first sealing surface, a recessed surface and a first inclined surface.

18. The battery cell manufacturing apparatus according to claim 16, further comprising:

a second sealing tool comprising a second sealing surface, wherein the second sealing surface is configured to seal the battery case except for a region on the dented portion.

19. The battery cell manufacturing apparatus according to claim 18, wherein the second sealing tool includes a second sealing surface and a second inclined surface.

20. The battery cell manufacturing apparatus according to claim 18, wherein the first sealing tool and the second sealing tool are integrated with each other.

* * * * *